(12) United States Patent
Kan et al.

(10) Patent No.: US 7,298,124 B2
(45) Date of Patent: Nov. 20, 2007

(54) PWM REGULATOR WITH DISCONTINUOUS MODE AND METHOD THEREFOR

(75) Inventors: Kwok Kei Toby Kan, Shatin (HK); Tak Ming Leung, Kowloon (HK)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 166 days.

(21) Appl. No.: 11/001,366

(22) Filed: Dec. 1, 2004

(65) Prior Publication Data

US 2006/0113974 A1    Jun. 1, 2006

(51) Int. Cl.
*G05F 1/40* (2006.01)
(52) U.S. Cl. .................. 323/283; 323/284; 323/235; 323/224
(58) Field of Classification Search .......... 323/283, 323/284, 235, 224
See application file for complete search history.

(56) References Cited

U.S. PATENT DOCUMENTS

| | | | | |
|---|---|---|---|---|
| 5,235,254 A | * | 8/1993 | Ho | 315/219 |
| 5,475,579 A | * | 12/1995 | John et al. | 363/21.07 |
| 5,481,178 A | | 1/1996 | Wilcox et al. | |
| 5,912,552 A | * | 6/1999 | Tateishi | 323/285 |
| 6,781,356 B1 | | 8/2004 | Yang et al. | |
| 6,853,174 B1 | * | 2/2005 | Inn | 323/285 |

OTHER PUBLICATIONS

Maxim, "Notebook CPU Step-Down Controller for Intel Mobile Voltage Positioning (IMVP-II)", 35 pages, No. 19-1960; Rev. 3; Aug. 2002; Maxim Integrated Products, Copyright 2002.

* cited by examiner

*Primary Examiner*—Shawn Riley
(74) *Attorney, Agent, or Firm*—Robert F. Hightower

(57) ABSTRACT

In one embodiment, a power supply controller has a variable frequency oscillator that is used for controlling a PWM controller. The power supply controller varies a frequency of the variable frequency oscillator.

19 Claims, 2 Drawing Sheets

PWM REGULATOR WITH DISCONTINUOUS MODE AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form pulse width modulated (PWM) power supply controllers. One important characteristic of the PWM controllers was the efficiency. Many PWM power supply controllers changed operating modes based on the amount of current required by the load. In some controllers, a continuous conduction mode was used when the current required by the load was large and a burst mode was used when the current required by the load was low. However, the burst mode often resulted in a large ripple voltage in the output voltage. While operating in the burst mode, the operating frequency often resulted in the PWM controller producing audible noise. Additionally, the PWM controllers needed complicated logic to switch the PWM controller between the two operating modes.

Accordingly, it is desirable to have a PWM controller that has high efficiency during light load conditions, that reduces the ripple voltage in light load conditions, that can reduce the audible noise, and that reduces the amount of control logic.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
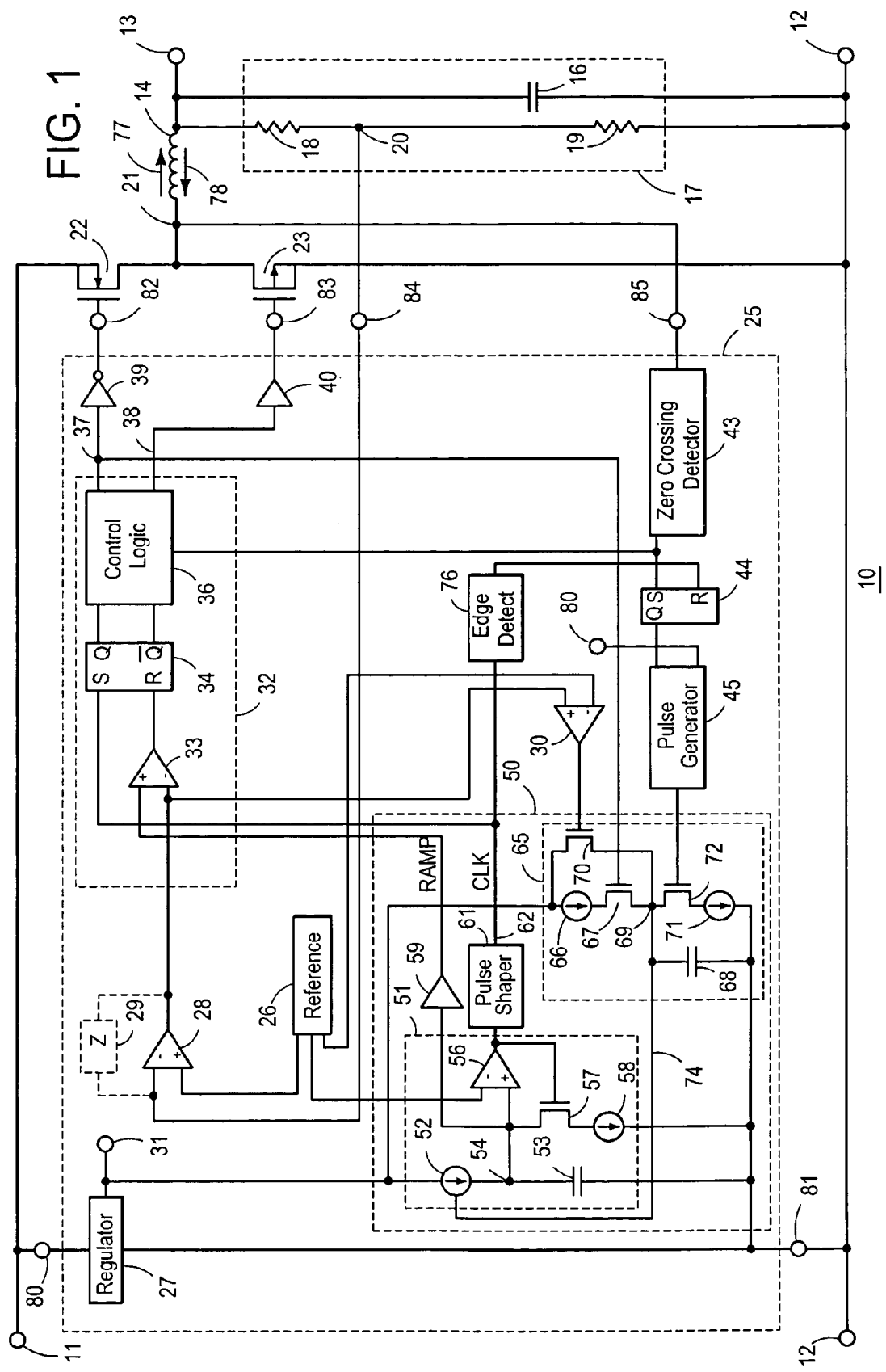
FIG. 1 schematically illustrates an embodiment of a portion of a power supply control system in accordance with the present invention.

FIG. 1 schematically illustrates an embodiment of a portion of a power supply control system 10 that includes a power supply controller 25. Power supply controller 25 assists in providing system 10 with a high efficiency during light load conditions. System 10 receives power, such as a DC voltage or a rectified AC voltage, between a power input 11 and a power return 12 and responsively generates a regulated output voltage between an output voltage terminal 13 and return 12. System 10 typically includes an energy storage inductor 14, an energy storage capacitor 16, a feedback network 17, a power switch or transistor 22 that is coupled to supply charging current to inductor 14, and a power switch or transistor 23 that is coupled to provide a discharge current for inductor 14. In the preferred embodiment, feedback network 17 includes a voltage divider formed by resistors 18 and 19 that connected in series between terminal 13 and return 12. A feedback node 20 is formed at the connection between resistors 18 and 19, and generates a feedback voltage that is representative of the value of the output voltage between terminal 13 and return 12. Network 17 and transistors 22 and 23 typically are external to controller 25; however, in some embodiments transistors 22 and 23 or network 17 may be internal to controller 25.

Power supply controller 25 includes a PWM controller 32, a zero crossing detector 43, a zero crossing latch 44, a pulse generator 45, a transient comparator 30, an oscillator circuit or oscillator 50, an error amplifier 28, a reference generator or reference 26, and an internal voltage regulator 27. Controller 25 receives power between a voltage input 80 and a voltage return 81. Input 80 generally is connected to input 11 and return 81 generally is connected to return 12. Regulator 27 receives the voltage from input 80 and forms an internal voltage for operating the elements within controller 25 as illustrated by the connection from an output 31 of regulator 27 to oscillator 50. Reference 26 is formed to generate reference voltages for operating various elements of controller 25 including a first reference voltage that is coupled to error amplifier 28, a second reference voltage that is coupled to a hysteresis comparator 56 of oscillator 50, and a third reference voltage that is coupled to transient comparator 30.

PWM controller 32 is formed to generate a first PWM drive signal on an output 37 of controller 32 and a second PWM drive signal on a second output 38 of controller 32. Controller 32 typically includes a PWM comparator 33, a PWM latch 34, and PWM control logic 36 that is used in controlling the timing of the PWM drive signals on outputs 37 and 38. Transistor driver 40 and inverting transistor driver 39 are formed to provide a drive capability that can provide sufficient current to drive respective transistors 22 and 23. Drivers 39 and 40 receive the respective first and second PWM drive signals from respective outputs 37 and 38 and responsively drive respective transistors 22 and 23 with the PWM drive signals through connections to respective outputs 82 and 83 of controller 25. Such PWM controllers and transistor drivers are well known to those skilled in the art.

Oscillator 50 is formed to provide a variable frequency clock signal (CLK) on an output 62 that is used as a timing reference for PWM controller 32. Oscillator 50 is also formed to provide a variable frequency ramp signal (Ramp) that is used as a reference voltage by PWM controller 32. Oscillator 50 includes a variable frequency oscillator (VFO) 51 that is formed to generate both the variable frequency ramp (Ramp) signal and a variable frequency oscillator signal that is used to form the variable frequency clock (CLK) signal. Oscillator 50 also includes a buffer 59 that isolates VFO 51 from controller 32 and also buffers the Ramp signal to provide sufficient drive for controller 32. A pulse shaper 61 of oscillator 50 receives the variable frequency oscillator signal generated by VFO 51, sharpens the edges of the variable frequency oscillator signal, and adjusts the duty cycle to form the CLK signal. In one embodiment, shaper 61 adjusts the duty cycle to approximately 50-50.

Preferably, shaper 61 does not alter the frequency so that the CLK signal has the same variable frequency as the variable frequency oscillator signal. In some embodiments, either or both of shaper 61 and buffer 59 may be omitted. VFO 51 includes hysteresis comparator 56, a variable current source 52, a timing capacitor 53, a discharge current source 58, and a discharge switch or transistor 57. The value of the current generated by variable current source 52 is controlled by the value of a frequency control signal that is applied to a current control input of source 52. Oscillator 50 also includes a frequency control circuit 65 that is formed to generate the frequency control signal on a frequency control output 74. As will be seen further hereinafter, increasing the value of the frequency control signal increases the frequency of the Ramp signal and the frequency of the variable frequency oscillator signal of VFO 51, thus, the frequency of the CLK signal and the corresponding operating frequency of PWM controller 32. The frequency of VFO 51, the Ramp signal, and the CLK signal is represented by:

$$F51=(K*V74)+Fmin$$

where

F51—is the oscillation frequency of VFO 51,

K—is the scaling actor of VFO 51,

V74—is the value of the variable frequency control signal on output 74, and

Fmin—is the minimum frequency of VFO 51.

Typically, Fmin is selected to be a frequency that is greater than the audible frequency range. For the example embodiment of VFO 51 illustrated in FIG. 1, the minimum frequency can be set by configuring source 52 to have a minimum current that results in the desired frequency. Circuit 65 includes a frequency increase current source 66, a frequency increase switch or transistor 67, a frequency decrease current source 71, a frequency decrease switch 72, a frequency capacitor 68, a transient switch or transistor 70, and a frequency control node 69 that is connected to output 74.

For normal load conditions, system 10 operates in a continuous conduction mode (CCM). For light load conditions, the current required by the load connected between terminal 13 and return 12 (not shown) decreases. Controller 25 responsively reduces the width of the drive pulse for transistor 22. In some cases, the load current decreases sufficiently so that a discharge current 78 through inductor 14 reaches a value that is substantially zero. This type of operation is often referred to as a discontinuous conduction mode (DCM). The discontinuous conduction mode (DCM) typically is identified as a cycle of the CLK signal in which discharge current 78 through inductor 14 reaches a value that is substantially zero. The DCM operation of a particular CLK cycle begins approximately after current 78 through inductor 14 reaches the substantially zero value. DCM operation can occur for one cycle or for multiple cycles of the CLK signal based on current 78 becoming substantially zero for that particular cycle. As will be seen further hereinafter, the zero crossing of current 78 is detected by detector 43. Discharge current 78 is the current through inductor 14. The current through transistor 23 may be different than just current 78. Thus, controller 25 is formed to be compatible with either CCM or DCM operation and continues to enable transistors 22 and 23 in the same manner during both CCM and DCM operation.

The operation of controller 25 during the first portion of the CLK cycle is the same in for either CCM or DCM operation. This first portion of the CLK cycle is the time that the PWM drive signal on output 37 of controller 32 is asserted. During this first portion of the CLK cycle, oscillator 50 generates the variable frequency clock signal (CLK) which sets latch 34 and facilitates controller 32 asserting the PWM drive signal on output 82 to enable transistor 22. Enabling transistor 22 supplies a charging current 77 to inductor 14, capacitor 16, and any load (not shown) connected between terminal 13 and return 12. Charging current 77 is the current through inductor 14. Asserting the CLK signal also resets latch 44 and prevents circuit 65 from decreasing the value of the frequency control signal on output 74 of circuit 65 while the PWM drive signal on output 37 of controller 32 is asserted. In the exemplary embodiment illustrated in FIG. 1, an edge detector circuit or edge detector 76 detects that the CLK signal is asserted and generates a pulse that resets latch 44. Asserting the PWM drive signal on output 37 also enables transistor 67 to conduct current from current source 66 to capacitor 68 thereby charging capacitor 68 and increasing the value of the frequency control signal applied to current source 52. Increasing the frequency control signal increases the amount of current supplied by source 52. Increasing the current supplied by source 52 increases the current supplied to charge capacitor 53 thereby charging capacitor 53 faster and increasing the operating frequency of oscillator 50. As the value of the voltage on capacitor 53 increases past the value of the second reference voltage applied to comparator 56, an output of comparator 56 goes high thereby enabling transistor 57 to begin discharging capacitor 53 through current source 58. Typically, the value of the discharge current supplied by source 58 is greater than the value of the current supplied by source 52. When source 58 has discharged capacitor 53 to a value approximately equal to or less than the value of the second reference voltage, the output of comparator 56 goes low thereby disabling transistor 57 which allows source 52 to again charge capacitor 53. Comparator 56 typically has a hysteresis input in order to prevent false triggering of comparator 56. As can be seen, VFO 51 functions as a relaxation oscillator. The example embodiment of VFO 51 and frequency control circuit 65 that are illustrated in FIG. 1 are example implementations of VFO 51 and circuit 65 but other implementations may be possible.

Error amplifier 28 receives the feedback signal through a connection between a feedback input 84 of controller 25 and node 20. In some embodiments, amplifier 28 may include a frequency compensation network 29. Amplifier 28 generates an error signal that is received by comparator 33. Comparator 33 also receives the Ramp signal from oscillator 50. When the value of the ramp signal is approximately equal to or greater than the value of the error signal, comparator 33 resets latch 34. The reset of latch 34 is received by logic 36 which responsively negates the PWM drive signal on output 82 and disable transistor 22. Negating the PWM drive signal on output 37 of controller 32 also disables transistor 67 and decouples current source 66 from capacitor 68 thereby terminating the charging of capacitor 68. Logic 36 also responsively generates a PWM drive signal on output 83 to enable transistor 23 to steer current 78 through transistor 23. As is well known to those skilled in the art, transistor 23 has a body diode that may conduct some current when transistor 23 is not enabled, thus, enabling transistor 23 steers the current through transistor 23 to be controlled by transistor 23.

If the current required by the load (not shown) connected between terminal 13 and return 12 remains large enough to prevent current 78 from becoming substantially zero, the second portion of the CLK cycle proceeds with CCM operation. In CCM operation of the second portion of the CLK cycle, controller 32 keeps transistor 23 enabled for the second portion of the CLK cycle and the corresponding cycle of controller 32 until oscillator 50 generates another cycle of the CLK signal and another corresponding PWM drive signal cycle. Unless current 78 reaches substantially zero, the operation continues in CCM operation as described previously.

As long as CCM operation continues, the value of the frequency control signal is increased by each PWM drive signal on output 37 until oscillator 50 reaches the maximum frequency of oscillator 50. Typically, the maximum frequency is selected to be the desired operating frequency in the continuous conduction mode. After the maximum frequency is reached during CCM operation, the operating frequency of oscillator 50 remains substantially constant. Thus, during CCM operation the frequency gradually increases until reaching the maximum frequency. For the example embodiment illustrated in FIG. 1, the maximum frequency (Fmax) of oscillator 50 is represented by:

$$Fmax=(V31*K)+Fmin$$

where

V31—is the value of the voltage on output 31 of regulator 27, and

K—is the scaling actor of VFO 51.

If the current required by the load decreases sufficiently, DCM operation will begin. A CLK cycle for DCM operation begins similarly to CCM operation with the same operation during the first portion of the CLK cycle. Oscillator 50 asserts the CLK signal to initiate a CLK cycle and a corresponding PWM drive signal cycle. Controller 32 responsively asserts the PWM drive signal on output 37 which resets latch 44 and enables transistor 22 to form current 77. Subsequently, comparator 33 resets latch 34 to terminate the PWM drive signal on output 37 of controller 32 and generate a PWM drive signal on output 38 to enable transistor 23.

Negating the PWM drive signal on output 37 of controller 32 also disables transistor 67 and decouples current source 66 from capacitor 68 thereby terminating the charging of capacitor 68. The amount of charge stored on capacitor 68 during the first portion of the CLK cycle that output 37 is asserted is represented by:

$$Qup=Ton*I66$$

where

Qup—the charge stored on capacitor 68,

Ton—the time that output 37 is asserted, and

I66—the current of source 66.

During DCM operation, time Ton is proportional to the square root of charging current 77, thus, the charge added to capacitor 68 and the increase in the frequency of oscillator 50 is representative of the current through inductor 14. As a result, the frequency of oscillator 50 will change gradually with current 77. After the PWM drive signal on output 37 is negated, the value of the voltage stored on capacitor 68 and the corresponding frequency control signal remain substantially constant because source 52 has a high input impedance. Consequently, the operating frequency of VFO 51 remains substantially constant after transistor 67 is disabled. As is well known to those skilled in the art, there may be some change in the frequency due to leakage current, however, the change is usually small and the value remains substantially constant. Typically changes of up to ten percent (10%) are regarded by those skilled in the art as substantially constant.

Approximately when current 78 becomes substantially zero, DCM operation begins. Zero crossing detector 43 is connected to node 21 to detect discharge current 78 through inductor 14 reaching a value that is substantially zero. When the value of current 78 becomes substantially equal to zero, the output of zero crossing detector 43 is asserted. As is well known to those skilled in the art, there may be minor offsets and variances that cause the output of detector 43 to be asserted slightly before or slightly after current 78 reaches a value of zero, however, the variance is usually small. Typically variances or errors of up to ten percent (10%) of the total cycle or period of the current through inductor 14 (the cycle of current 77 plus current 78) are regarded by those skilled in the art as substantially zero. Such zero crossing detectors are well known to those skilled in the art. Control logic 36 receives the asserted output of detector 43 and responsively disables transistor 23. The asserted output of detector 43 also sets latch 44 forcing the Q output high. Pulse generator 45 generates a pulse in response to the Q output going high. The high output of generator 45 enables transistor 72 thereby coupling source 71 to begin discharging capacitor 68 and decreasing the value of the frequency control signal applied to current source 52. Oscillator 50 receives the frequency control signal and responsively decreases the operating frequency.

When the asserted period of the output of generator 45 expires, the output is negated which disables transistor 72 and terminates the discharging of capacitor 68. Thus, asserting the zero crossing signal (ZC) removes a fixed amount of charge from capacitor 68 that reduces the average value of the charge on capacitor 68. The amount of charge removed is represented by:

$$Qdn=T45*I71$$

where

Qdn—the charge removed from capacitor 68,

T45—the width of the pulse of generator 45, and

I71—the current of source 71.

Reducing the value of the voltage on capacitor 68 reduces the value of the frequency control signal applied to source 52 and the current supplied by source 52. Decreasing the current supplied to charge capacitor 53 charges capacitor 53 slower and decreases the operating frequency of the CLK and Ramp signals and increases the corresponding operating period of controller 25. Decreasing the operating frequency of controller 25 increases the time between leading edges of the PWM drive signal on output 82. It should be noted that the width of the PWM drive signal on output 82 is different from the period between leading edges. After disabling transistor 72, the value of the frequency control signal remains substantially constant because of the high input impedance of source 52. The value of the frequency control signal remains substantially constant until oscillator 50 generates another asserted CLK signal to assert another PWM drive signal. The amount of the change in the value of the variable frequency control signal and the corresponding frequency of the CLK signal can be adjusted by changing the ratio of the current from sources 66 and 71, or changing the value of either of capacitor 68, or changing the width of the pulse formed by generator 45.

Outputs 37 and 38 remains negated and transistors 22 and 23 remain disabled until oscillator 50 generates another cycle of the CLK signal. As long as the current required by the load remains light, the DCM operation continues for each cycle of the CLK signal. At some point during DCM operation, Qup and Qdn can become equal and controller 25 operates in an equilibrium condition that keeps the operating frequency of controller 25 substantially constant. The duration of the pulse formed by generator 45 affects where the equilibrium condition occurs. Consequently the width of the pulse generally is selected to ensure that the equilibrium can occur in a steady state condition. In one embodiment, the width of the pulse is between approximately twenty and two hundred (20-200) nanoseconds in order to remove the fixed charge from capacitor 68 to achieve the equilibrium.

As explained previously, the value of the variable frequency control signal is reduced only during DCM operation.

During large transient conditions, the output voltage on output terminal 13 may change a large amount and the load connected thereto may require a large change in the load current. Transient comparator 30 is used to form a quick change in the value of charging current 77 during transient conditions and during start-up conditions in order to provide the desired current to the load. Comparator 30 compares the error signal from amplifier 28 to the third reference voltage from reference 26. The value of the third reference voltage is selected to be near a value the feedback signal that represents a large change in the output voltage. Typically, the value of the third reference voltage is larger than the first reference voltage in order to accomplish the quick change. When the output voltage decreases a large amount, the value of the error signal increases. If the error voltage increases to a value approximately equal to or greater than the third reference voltage, the output of comparator 30 is asserted which enables transistor 70 to connect capacitor 68 to the internal operating voltage from regulator 27. Enabling transistor 70 quickly charges capacitor 68 thereby increasing the value of the frequency control signal and the corresponding frequency of the CLK signal.

The width of the pulses created by generator 45 typically is dependent on the input voltage on input 80. This is illustrated by the input of generator 45 that is connected to input 80. As the voltage on input 80 increases, the width of the pulse from generator 45 may decrease. Such a decrease reduces the amount of charge removed from capacitor 68 thereby reducing the frequency dependency on the input voltage. In some embodiments, this voltage dependency is a result of current sources that are connected to receive power from input 80.

As illustrated in FIG. 1, system 10 is coupled in a buck configuration. However, those skilled in the art will realize that controller 25 may also be coupled in a any other type of dc-dc converter having a switching oscillator including boost or buck-boost configurations that have power supply controllers coupled as current mode, feed-forward, voltage mode or other types of controllers. Additionally, oscillator 50 may be used in other oscillator applications.

In order to provide the functionality described for FIG. 1, regulator 27 has a first terminal connected to input 80, a second terminal connected to return 81, and output 31 connected to a first terminal of source 52. A second terminal of source 52 is commonly connected to a first terminal of capacitor 53, a drain of transistor 57, an input of buffer 59, and a non-inverting input of comparator 56. A control input of source 52 is connected to a first terminal of capacitor 68, a drain of transistor 72, and a source of transistors 67 and 70. A second terminal of capacitor 53 is connected to return 81 and to a first terminal of source 58. A second terminal of source 58 is connected to a source of transistor 57. A gate of transistor 57 is connected to the output of comparator 56 and an input of shaper 61. An inverting input of comparator 56 is connected to a second reference output of reference 26. A second terminal of capacitor 68 is connected to return 81 and to a first terminal of source 71. A drain of transistor 67 is connected to a first terminal of source 66. A second terminal of source 66 is commonly connected to a drain of transistor 70 and output 31 of regulator 27. A gate of transistor 70 is connected to an output of comparator 30. A second terminal of source 71 is connected to the source of transistor 72. A gate of transistor 72 is connected to the output of generator 54 which has an input connected to the Q output of latch 44. A set input of latch 44 is commonly connected to a control input of logic 36 and an output of detector 43. A reset input of latch 44 is connected to an output of detect 76. An input of detector 43 is connected to input 85. The Ramp output of buffer 59 is connected to a non-inverting input of comparator 33. Output 62 of shaper 61 is connected to a set input of latch 34 and to an input of detect 76. A reset input of latch 34 is connected to an output of comparator 33. An inverting input of comparator 33 is commonly connected to a non-inverting input of comparator 30 and to an output of amplifier 28. An inverting input of comparator 30 is connected to a third output of reference 26. A first output of reference 26 is connected to a non-inverting input of amplifier 28 which has an inverting input connected to input 84. A Q output of latch 34 is connected to an input of logic 36 and a Q bar output of latch 34 is connected to another input of logic 36. Output 37 of logic 36 is connected to an input of driver 39 which has an output connected to output 82. Output 38 of logic 36 is connected to an input of driver 40 which has an output connected to output 83.

Figure 2:
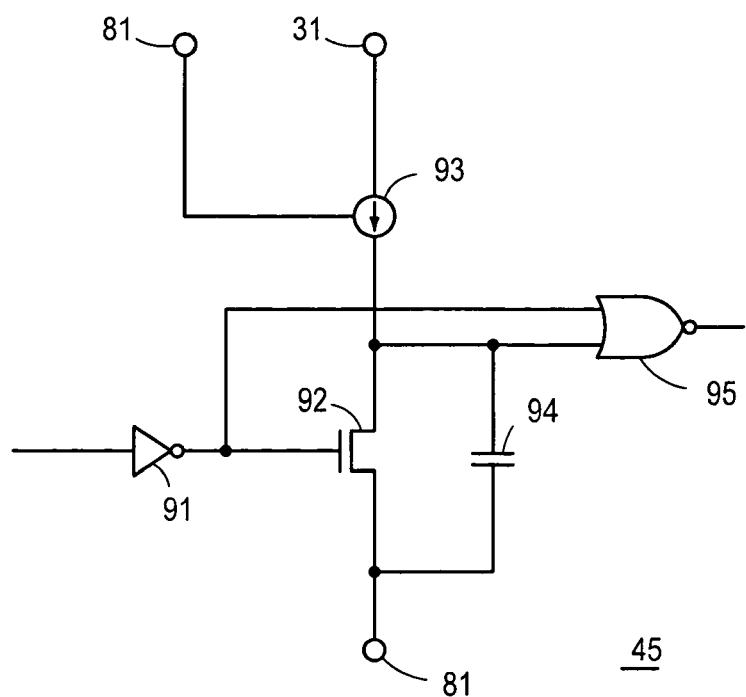
FIG. 2 schematically illustrates an embodiment of a portion of the power supply control system of FIG. 1 in accordance with the present invention.

FIG. 2 schematically illustrates a portion of an example of an embodiment of pulse generator 45. Those skilled in the art will realize that the embodiment illustrated in FIG. 2 is one example of a pulse generator configuration and that other configurations are possible. Generator 45 includes an inverter 91, a timing switch or transistor 92, a timing capacitor 94, a timing current source 93, and a NOR gate 95. Typically current source 93 is a controllable current source that has a current that value that is controlled by a control input 80. For example source 93 may be a voltage controlled current source that is controlled by the value of the voltage on input 80. In the embodiment illustrated in FIG. 1, input 81 is connected to input 80 to be controlled by the value of the input voltage.

Figure 3:
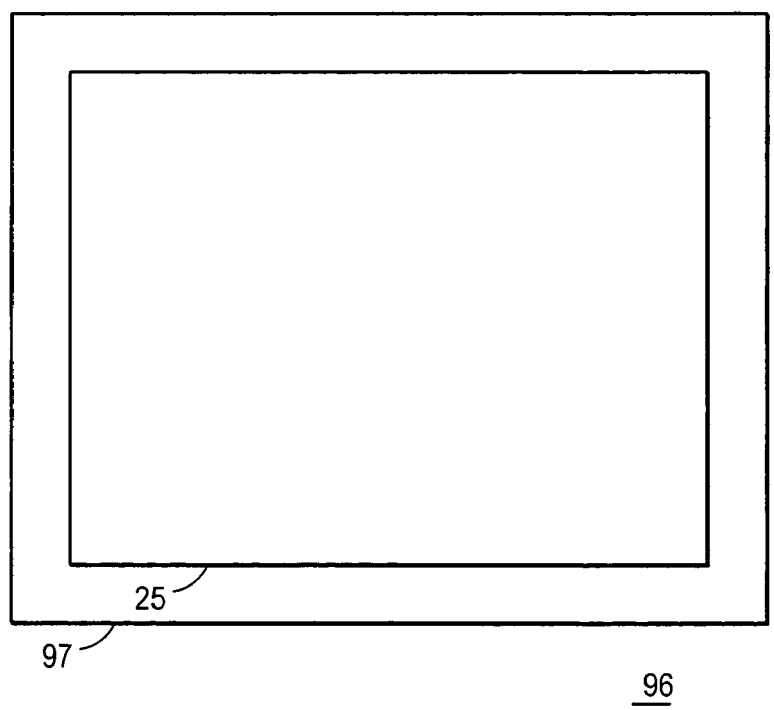
FIG. 3 is a plan view of an embodiment of a portion of a semiconductor device that includes a portion of the power supply control system of FIG. 1 in accordance with the present invention.

FIG. 3 schematically illustrates an enlarged plan view of a portion of an embodiment of a semiconductor device 96 that is formed on a semiconductor die 97. Controller 25 is formed on die 97. Die 97 may also include other circuits that are not shown in FIG. 3 for simplicity of the drawing. Controller 25 and device 96 are formed on die 97 by semiconductor manufacturing techniques that are well known to those skilled in the art.

In view of all of the above, it is evident that a novel device and method is disclosed. Included, among other features, is forming the oscillator of a power supply controller to have a frequency that is responsive to the charging current of a inductor of a power supply system in which the power supply controller is configured. Changing the frequency of the oscillator responsively to the current through the inductor improves the efficiency of the power supply controller in light load current conditions by reducing the operating frequency of the power supply controller during DCM operation. Additionally, changing the frequency to improve efficiency does not require a lot of control logic thereby reducing the cost of the power supply controller. Additionally, the oscillation frequency is more easily controlled.

While the invention is described with specific exemplary embodiments, it is evident that many alternatives and variations will be apparent to those skilled in the semiconductor arts. More specifically VFO 51, generator 45, and circuit 65 may have many different embodiments as long as the oscillator has a variable frequency that is changed in the DCM operation mode. For example, circuit 65 may be replaced with any type of low pass filter or integrator. It should be noted that the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power supply controller comprising:
configuring the power supply controller to form a PWM drive signal operable to control a power switch to form a current through an inductor of a power supply system;
configuring the power supply controller to receive a current sense signal that is representative of current flow through the inductor; and
configuring the power supply controller to reduce an operating frequency of the power supply controller responsively to the power supply controller detecting a zero crossing of the current through the inductor and responsively to operating in a discontinuous conduction mode wherein the operating frequency is greater than zero.

2. The method of claim 1 further including configuring the power supply controller to receive a feedback signal representative of an output voltage of the power supply system and responsively negate the PWM drive signal.

3. The method of claim 1 wherein configuring the power supply controller to reduce the operating frequency of the power supply controller includes configuring the power supply controller to decrease a frequency of an oscillator of the power supply controller responsively to the power supply controller operating in the discontinuous conduction mode and coupling a PWM controller of the power supply controller to receive a clock signal from the oscillator and responsively assert the PWM drive signal.

4. The method of claim 1 further including configuring the power supply controller to increase the operating frequency a least a portion of a time that the PWM drive signal is asserted.

5. The method of claim 1 wherein configuring the power supply controller to reduce the operating frequency of the power supply controller includes configuring the power supply controller to generate a frequency control signal having a value that is representative of the current through the inductor, and configuring the power supply controller to increase an average value of the frequency control signal responsively to asserting the PWM drive signal.

6. The method of claim 1 wherein configuring the power supply controller to form the PWM drive signal includes configuring the power supply controller to remove charge stored on a capacitor to decrease an average value of a frequency control signal responsively to the current through the inductor becoming substantially zero.

7. The method of claim 6 wherein further including configuring the power supply controller to store charge on the capacitor responsively to asserting the PWM drive signal.

8. The method of claim 6 further including configuring the power supply controller to couple the capacitor to a supply voltage responsively to a transient.

9. A power supply control method comprising:
forming a control signal that is representative of a substantially zero crossing of a current through an energy storage inductor of a power supply system;
using the control signal to control a frequency of a clock signal of a variable frequency oscillator wherein the frequency of the clock signal is greater than zero; and
applying the clock signal to a PWM controller of the power supply system wherein the PWM controller responsively initiates asserting a PWM drive signal of the power supply system responsively to the clock signal.

10. The method of claim 9 further including forming a variable frequency ramp signal and negating the PWM drive signal responsively to the variable frequency ramp signal.

11. The method of claim 9 wherein forming the control signal that is representative of the substantially zero crossing of the current through the energy storage inductor of the power supply system includes increasing a value of a frequency control signal responsively to asserting the PWM control signal and decreasing the value of the frequency control signal responsively to detecting the substantially zero crossing of the current through the energy storage inductor.

12. The method of claim 11 wherein increasing the value of the frequency control signal responsively to asserting the PWM control signal includes storing charge on a capacitor responsively to asserting the PWM drive signal.

13. The method of claim 11 wherein decreasing the value of the frequency control signal responsively to detecting the substantially zero crossing of the current through the energy storage inductor includes removing charge from a capacitor responsively to detecting a substantially zero value.

14. A power supply controller comprising:
a PWM controller coupled to receive a clock signal and responsively generate a PWM drive signal operable to enable a power switch to generate a current through an inductor; and
a variable frequency oscillator of the power supply controller configured to generate the clock signal and change an operating frequency of the clock signal responsively to the current through the inductor becoming substantially zero.

15. The power supply controller of claim 14 wherein the variable frequency oscillator of the power supply controller configured to generate the clock signal and change the operating frequency of the clock signal includes the variable frequency oscillator coupled to change the operating frequency responsively to asserting the PWM drive signal.

16. The power supply controller of claim 15 wherein the variable frequency oscillator coupled to change the operating frequency responsively to asserting the PWM drive signal includes the variable frequency oscillator coupled to store charge on a capacitor responsively to asserting the PWM drive signal.

17. The power supply controller of claim 16 further including the variable frequency oscillator coupled to remove charge from the capacitor after negating the PWM drive signal.

18. The power supply controller of claim 14 wherein the variable frequency oscillator of the power supply controller configured to generate the clock signal and change the operating frequency of the clock signal includes a zero current detector configured to generate a zero crossing signal representative of the current through the inductor becoming substantially zero wherein the variable frequency oscillator is operably coupled to receive the zero crossing signal and responsively change the operating frequency of the variable frequency oscillator.

19. The power supply controller of claim 18 wherein the variable frequency oscillator is operably coupled to receive the zero crossing signal and responsively change the operating frequency of the variable frequency oscillator includes the variable frequency oscillator operably coupled to decrease the operating frequency responsively to the zero crossing signal.

* * * * *